Figure 6:
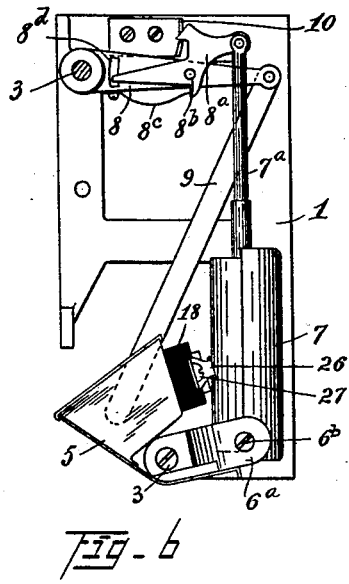

F. F. WEISHAAR AND B. R. DRAUDT.
SIGNALING DEVICE.
APPLICATION FILED MAR. 16, 1918.
1,323,208.
Patented Nov. 25, 1919.
3 SHEETS—SHEET 1.
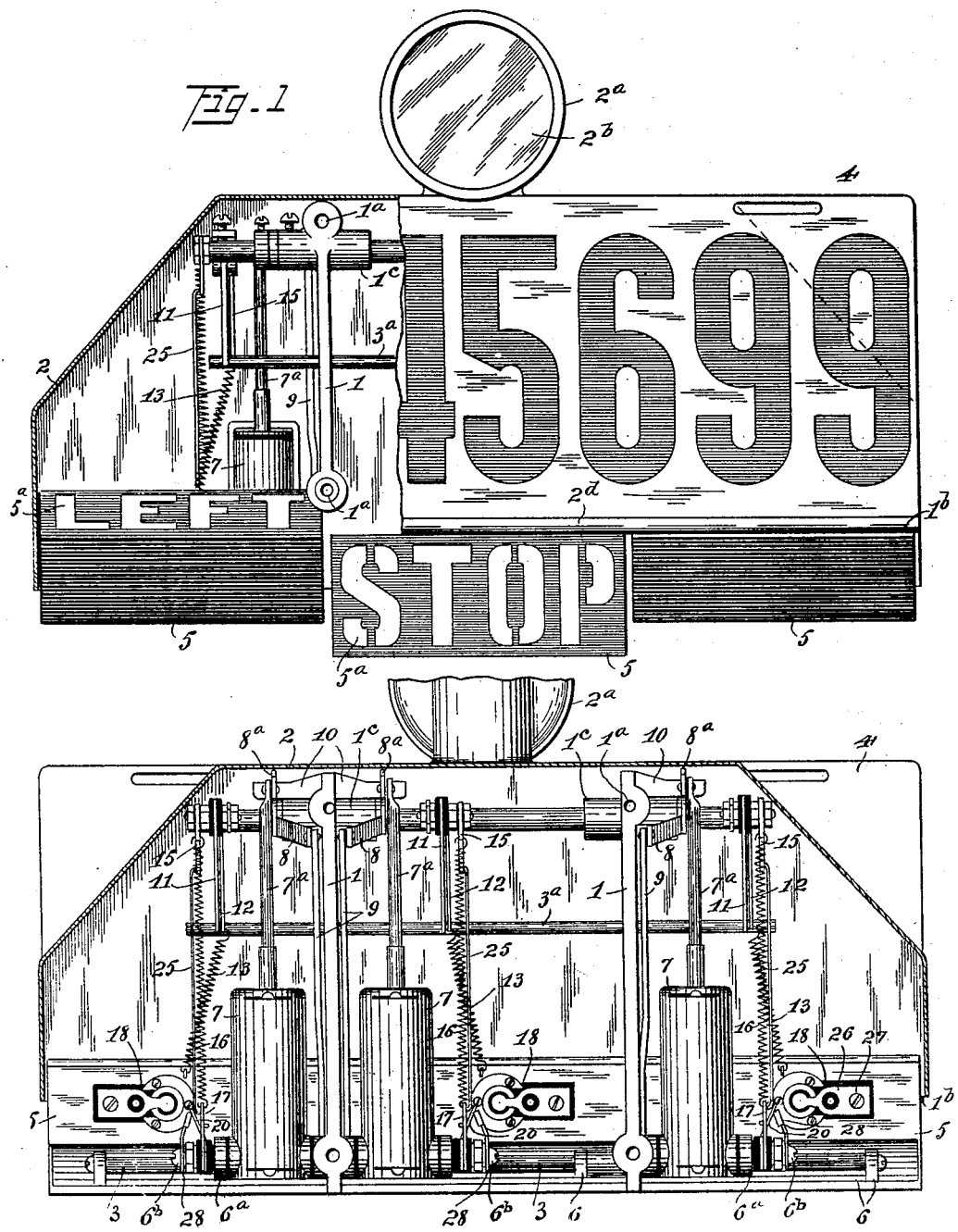
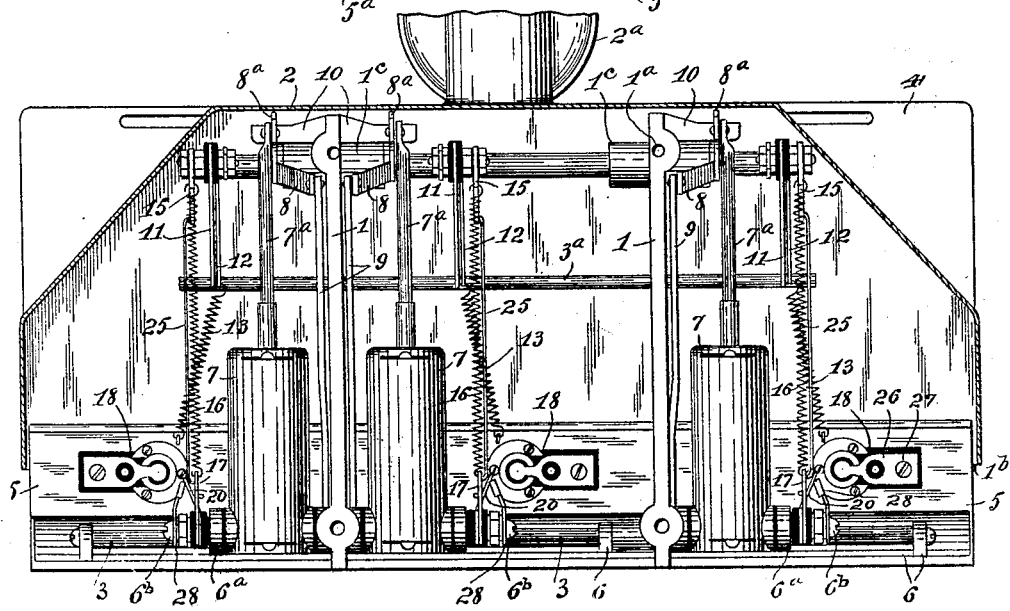

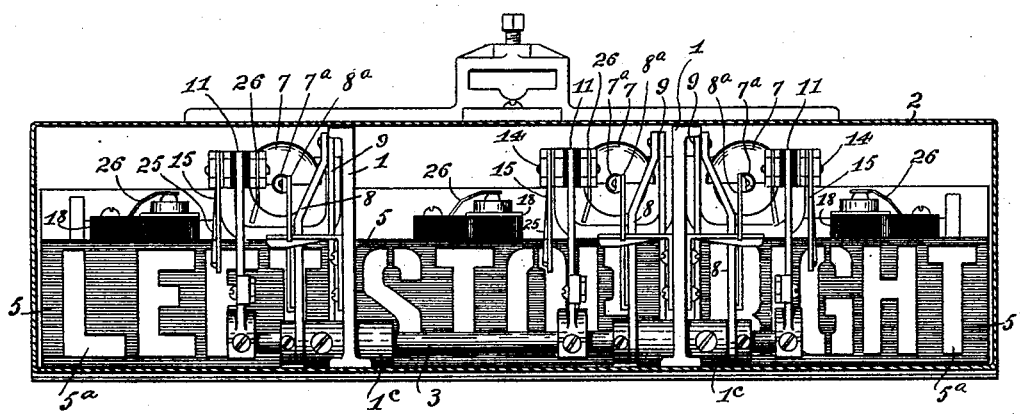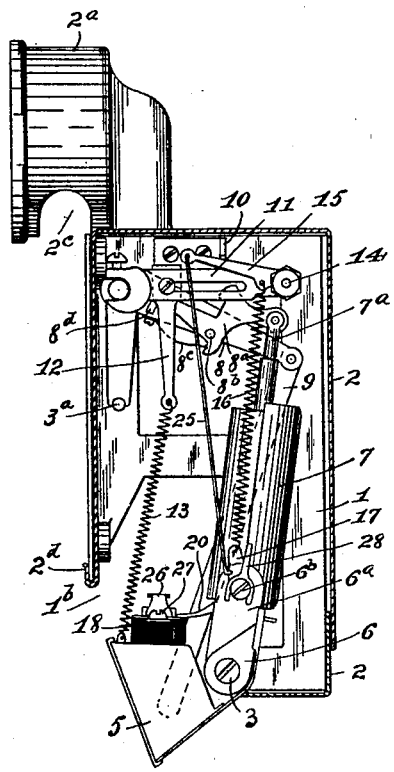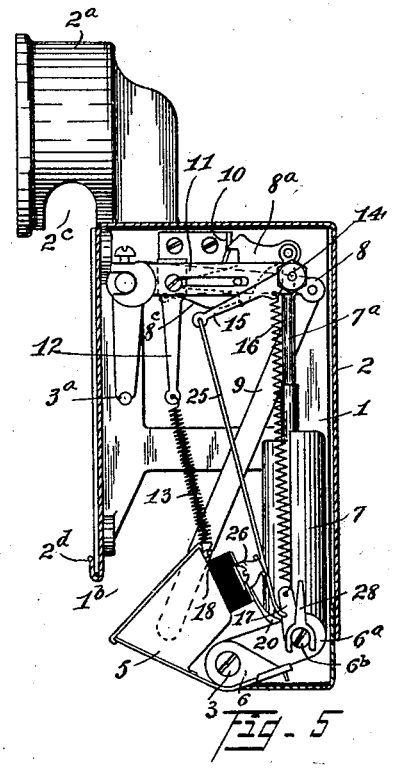

F. F. WEISHAAR AND B. R. DRAUDT.
SIGNALING DEVICE.
APPLICATION FILED MAR. 16, 1918.

1,323,208.

Patented Nov. 25, 1919.
3 SHEETS—SHEET 3.

Inventors
Fred F. Weishaar
Benjamin R. Draudt
By Okdt. Bellman Atty.

UNITED STATES PATENT OFFICE.

FRED F. WEISHAAR AND BENJAMIN R. DRAUDT, OF CLEVELAND, OHIO; SAID DRAUDT ASSIGNOR TO SAID WEISHAAR.

SIGNALING DEVICE.

1,323,208.          Specification of Letters Patent.      Patented Nov. 25, 1919.

Application filed March 16, 1918. Serial No. 222,797.

*To all whom it may concern:*

Be it known that we, FRED F. WEISHAAR and BENJAMIN R. DRAUDT, citizens of the United States, residing at Cleveland, in the county of Cuyahoga and State of Ohio, have invented certain new and useful Improvements in Signaling Devices, of which the following is a specification.

The invention relates to improvements in signaling devices, and more particularly to that class or type which comprises a plurality of movable signaling elements connected to and adapted to be selectively operated by a plurality of electric circuits energized and deënergized through the medium of suitable switching mechanism.

The present embodiment of the invention is particularly designed and adapted for use as a rear signaling device for motor vehicles, such as automobiles, motor trucks, and other self-propelled vehicles.

The primary object of the invention is to provide a generally improved signaling device of this class which may not only be used for night driving, but may also be used for day driving, the improved device being connected through suitable conduits to a suitable source of electric energy and a suitable electric switch, the latter being mounted within convenient reach of the chauffeur or driver of the vehicle whereby the same may be readily and conveniently operated through suitable signaling elements at the rear to signal or indicate to those at the rear the movement or direction or turn which the vehicle is to take, as for example, a "Stop" (through the middle signaling element) or to the "Right" or to the "Left" as selectively determined upon in accordance with the particular desires of the driver and general traffic conditions.

A further object is the provision of a rear signal device of this class, particularly designed and adapted to conveniently carry and illuminate the rear license or number plate, together with improved movable or tilting signaling elements, such for example, as lettered indicator receptacles or panels adapted to be selectively moved into and out of signaling position and normally concealed within the body or casing, said lettered indicators being also provided with a suitable source of illumination adapted to be simultaneously energized and deënergized with the movements of said lettered indicators toward and from said signaling positions, respectively.

While the present embodiment of the invention relates to rear signaling devices for motor vehicles, it is, of course, apparent that the principles of the invention are applicable to a wide range of use, particularly such as changeable signs in advertising, indicating devices, and the like.

With the above mentioned and other ends in view, the invention consists in the novel construction, arrangement, and combination of parts, hereinafter described, illustrated in one of its embodiments in the accompanying drawings, and particularly pointed out in the appended claims.

Referring to the drawings forming a part of this specification, Figure 1, is a rear view of a signaling device constructed in accordance with this invention and embodied in the specific form of an automobile rear signal, a portion of the rear wall of the casing being broken away and one of the indicator or signaling elements being dropped down in its energized or signaling position for the purpose of clearer illustration of the parts.

Fig. 2, a front elevation of the same, the front wall of the casing being removed.

Fig. 3, a top plan view of the same, the casing being shown in horizontal section.

Fig. 4, a vertical cross sectional view, showing one of the indicator or signaling elements and the connecting parts in down or operative signal indicating position.

Fig. 5, a similar view showing the signaling elements and parts in their opposite or non-signaling position.

Fig. 6, a side elevation of one of the frame members and indicator units detached from the casing, the indicator actuating solenoid and lever mechanism being in locking or non-signaling position, certain connecting levers and springs being removed for the purpose of clearer illustration of the parts.

Figure 7:
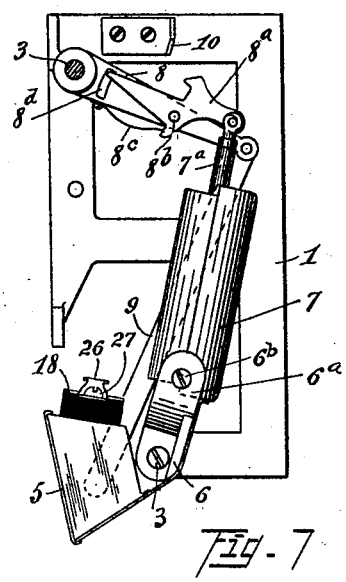

Fig. 7, a similar view showing the indicator and its actuating solenoid and lever mechanism in energized or signaling position.

Figure 8:
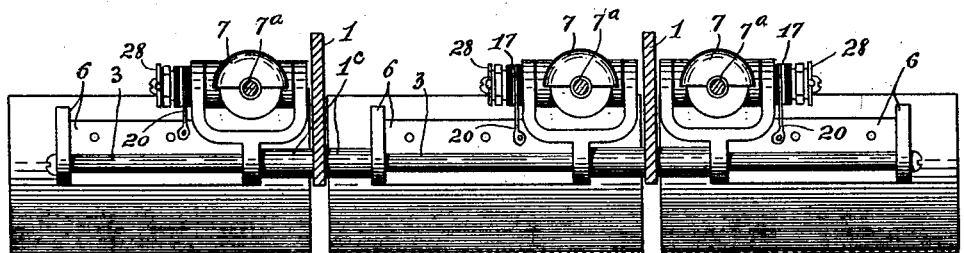

Fig. 8, a horizontal sectional view taken through the indicators and above the solenoids, and illustrating the general arrangement and connections of said parts.

Figure 9:
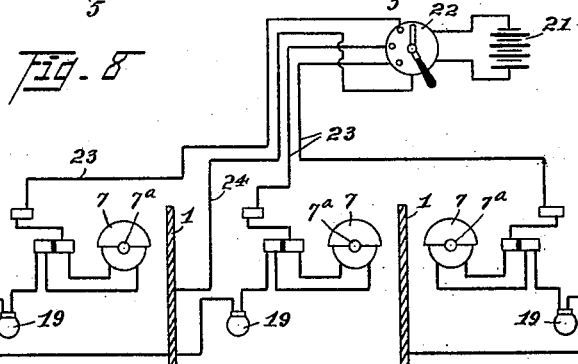

Fig. 9, a detail cross sectional view of one of the indicators or signaling elements detached, and illustrating in particular the lamp mounting and electrical connections therefor.

Figure 10:
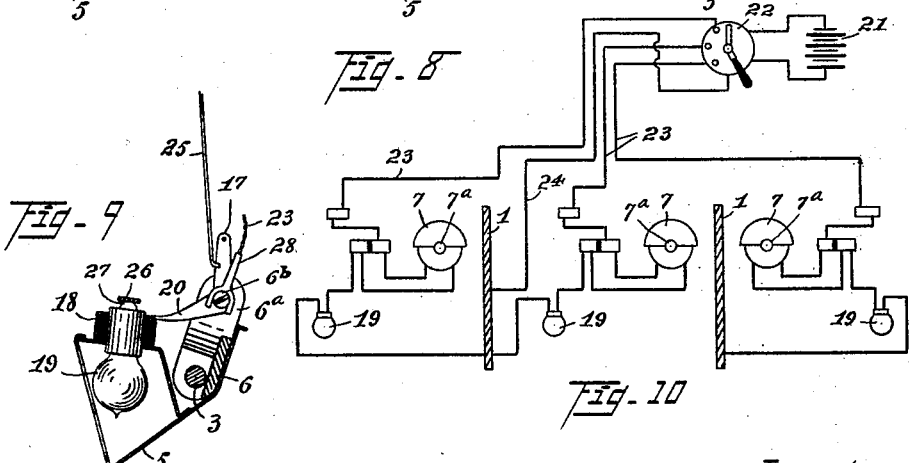

Fig. 10, a diagrammatic view of the various electric circuits and their connections.

Similar numerals of reference designate like parts throughout all the figures of the drawings.

The improved signaling device comprises a suitable frame consisting, in the present instance, of suitably spaced frame units or sections 1, adapted to carry a surrounding casing 2, and for the purpose of securing the casing the frame sections 1, may be provided with threaded openings 1$^a$, adapted to receive and carry suitable attaching screws passing through the casing.

The casing 2 is provided with an opening or recess 1$^b$, in its bottom portion and to which the lettered indicator elements, hereinafter referred to, are adapted to operate and be projected and retracted into and out of their respective signaling and non-signaling positions, respectively, as hereinafter described.

As a means of properly spacing and holding the frame sections in proper spaced relation, the latter are provided with laterally extending boss members 1$^c$, adapted to receive and contain suitable bearing shafts 3, and the frame members 1, are also preferably provided with an auxiliary shaft 3$^a$, for supporting brackets mounted on the upper bearing shaft 3, as hereinafter described.

In adapting the improved signaling device for use as a rear signal for automobiles, the casing 2, is preferably provided at its top with a tail light housing or casing 2$^a$, adapted to receive a suitable tail light bulb and a suitable lens 2$^b$, (see Fig. 1) and as a means of illuminating a license number plate 4, the housing 2$^a$, is provided with an opening 2$^c$, in its lower portion to permit the light to pass downwardly and over the sign plate 4, to illuminate the latter.

As a convenient means of holding and supporting the sign plate 4, in proper position immediately beneath the tail light the rear wall of the casing 2, is preferably provided with a hooked flange 2$^d$, to receive and contain the lower edge of the sign plate or license number plate 4.

As a means of providing a plurality of indicator or signaling elements, the frame sections 1, are provided with a plurality of indicator elements 5, arranged, in the present instance, to operate within the opening or recess 1$^b$, of the casing 2, said indicator elements 5, in the present instance, being in the form of lettered receptacles having transparent letters 5$^a$, and for the purpose of day driving, said letters 5$^a$ may be of suitable white or light colored translucent material, and in either instance, said letters are adapted to permit light from the source of illumination within the indicators to pass out through and illuminate the transparent letters 5$^a$. The lettered indicators 5, are adapted to rock or tilt within the opening or recess 1$^b$, and to be projected from and retracted within the casing by the operating mechanism hereinafter described, and as a convenient means of so mounting the lettered indicators 5, the latter, in the present instance, are provided with brackets 6, mounted on the lower bearing shaft 3, said brackets 6, being provided with forwardly extending forked arms 6$^a$, secured to the lower ends of suitable solenoids 7, through the medium of suitable attaching screws 6$^b$.

As a means of giving the indicator elements 5, the requisite movement, and particularly as a means of normally locking the latter in their normal or retracted position, in connection with the actuating solenoid mechanism, each solenoid is provided with an armature 7$^a$, in the present instance, in the form of an armature shaft 7$^a$, connected to an auxiliary or latching lever 8$^a$, pivotally mounted on a master lever 8, said lever 8, being mounted upon the upper bearing shaft 3, and as a means of limiting the movement of the indicator 5, in its respective projected and retracted positions, the master lever 8, is provided with a connecting link 9, pivotally connected at its lower end to the indicator 5.

As a means of normally holding and locking the solenoids and indicator elements in a stationary position when the solenoids are not energized by the electric current, as hereinafter referred to, the auxiliary or latching levers 8$^a$, are mounted on pivots 8$^b$, and are adapted to act against the resistance of a spring 8$^c$, which latter acts to normally hold the head of the auxiliary or latching lever in engagement with a bracket 10, immediately above so that these parts are held in a stationary position as against vibration, or the like, and until the solenoids 7, are energized by the passage of the electric current therethrough. As a means of limiting the movements of the auxiliary or latching levers 8$^a$, the latter are provided at their ends with lugs adapted to operate in slots 8$^d$, in the master levers 8.

When the solenoids are energized, it is obvious that the initial movement of the armature shaft 7$^a$, will detach the auxiliary levers 8$^a$, from the brackets 10, thereby causing the parts to assume the position indicated in Figs. 4, and 7, of the drawings, and to be retained in such position until the solenoid in the particular circuit is deënergized, and as a means of returning the indicators and solenoids together with the attached parts to their initial or latched and interlocked position, the upper bearing shaft 3, and the auxiliary shaft 3ª, are provided with stationary brackets 11, the latter being provided with depending bracket arms 12, said bracket arms 12, being provided with coiled expansion springs 13, leading downwardly and attached to the free edge of the indicator element 5, and as a means of counteracting the action of the springs 13, and particularly in maintaining a tension upon the parts and upon the latching members 8ª, when the parts are in their normal or non-signaling positions as indicated in Figs. 5, and 6, of the drawings, the rear ends of the brackets 11, are provided with pivot bearing members or bolts 14, provided with arms 15, and the latter are provided with coiled expansion springs 16, said springs 16, leading downwardly to brackets 17, on the bearing screws 6ᵇ, at the lower ends of the solenoids 7.

As a means of illuminating the indicator elements 5, when the solenoids are energized, and upon and during the movements of such indicator elements 5, toward and in their signaling positions, the indicator elements or receptacles 5, are provided with insulated lamp sockets 18, adapted to receive and carry suitable incandescent lamps 19, the latter being adapted to be simultaneously energized with the solenoids by being placed in the same circuit therewith through the medium of conducting brackets 20, leading from the conducting pivot screws 6ᵇ, said conducting brackets 20, being insulated from the brackets 17.

Upon reference to Fig. 10, of the drawings, it will be understood that the respective armatures and signaling or indicating elements may be selectively energized and deënergized by being placed into and out of circuit through a suitable source of electric energy 21, and a suitable switch 22, the feed wires or circuits 23, going through the solenoids and lamp as indicated and returning through the frame members and return wire 24, it being understood that in the present embodiment of the invention the feed wires are in circuit with the pivot bearing bolts 14, and pass thence through the arms 15, as conducting arms, and thence down through the conducting wires or links 25, and through suitable connections in the brackets 17, through the solenoids 7, to the conducting brackets 20, leading to the lamps, passing from said lamps through the brackets 26, and screws 27, through the parts in the machine frame, and returning through the return wire or conduit 24, the solenoids 7, being in circuit through suitable connections leading from the lower ends of the conducting links 25 (see Fig. 8) and suitable conduits 23, (see Fig. 9) leading to the conducting brackets 28 on the conducting screws 6ᵇ.

From the foregoing description, taken in connection with the accompanying drawings, the operation and advantages of the invention will be readily understood.

Having thus described one of the embodiments of the invention, what is claimed and desired to be secured by Letters Patent, is,—

1. In a signaling device, a frame provided with movable indicator elements, relatively movable solenoids and armatures operatively connected to said indicator elements and frame, respectively, said solenoids being also relatively movable with respect to said indicator elements and frame, means for normally interlocking said armatures and solenoids relative to said frame, a source of electric energy, and electric circuits connected to said solenoids and adapted to operate said interlocking means and said indicator elements through said solenoids when energized.

2. In a signaling device, a frame, a casing, a plurality of indicator elements rotatably mounted therein, solenoids operatively connected to and movable relatively of said indicator elements, means for normally holding said solenoids and indicator elements in relatively stationary interlocked relation to each other, a source of electric energy, and electric circuits connected to said solenoids and indicator elements and adapted to operate and energize the latter through said solenoids.

3. In a signaling device, a frame provided with a casing, lettered indicators pivoted on said frame, relatively movable solenoids and armatures operatively connected to said indicators and frame, respectively, and normally interlocking with each other, said solenoids being also relatively movable with respect to said indicator elements and frame, means for electrically energizing and deënergizing said indicators and solenoids in selective relation to each other, and means for simultaneously illuminating and moving said indicators to signaling position through said solenoids and armatures when energized.

4. In a signaling device, a plurality of movable indicator elements, relatively movable solenoids and armatures having levers operatively connected to said indicator elements and frame, respectively, said solenoids being also relatively movable with respect to said indicator elements and frame, means for normally interlocking said armatures and levers in relatively fixed connection with said frame, a source of electric energy, and electric circuits connected to said solenoids and adapted to release said interlocking means and operate said indicator elements through said armatures and levers when said solenoids are energized.

5. In a signaling device, a frame, a casing, a plurality of indicator elements pivotally mounted therein, relatively movable solenoids and armatures operatively connected to said frame and indicator elements, said solenoids being also relatively movable with respect to said indicator elements and frame, spring resisted lock and lever mechanism for normally holding said solenoids and indicator elements in a stationary interlocked position to each other and to said frame, a source of electric energy, and electric circuits connected to said solenoids and indicator elements and adapted to unlock and operate the latter through said solenoids when energized.

6. In a signaling device, a frame, a casing surrounding said frame and provided with a recess, indicators movable on said frame in and through said recess, solenoids and armatures pivotally and movably connected relatively to said indicators and frame and normally interlocking with each other, said solenoids being also relatively movable with respect to said indicator elements and frame; means for electrically energizing and deënergizing said indicators and solenoids in selective relation to each other, and means for simultaneously illuminating and moving the corresponding connected indicator to signaling position in said recess through said solenoids and armatures when energized.

7. In a signaling device, spaced frame members, a surrounding casing, bearing shafts carried by said frame members, indicator receptacles movable on said shafts, solenoids and armatures movably and pivotally connected to and movable relatively of said indicator receptacles, spring actuated means movably connected to the latter and to said indicator receptacles for returning and interlocking the parts in a stationary position when said solenoids are deënergized, and means for releasing said interlocked parts and actuating said spring actuated means and illuminating said indicator receptacles when said solenoids are energized.

8. In a signaling device, spaced frame members, a surrounding casing, bearing shafts carried by said frame members, indicator receptacles movable on said shafts into and out of said casing, solenoids pivotally connected to and relatively movable of said indicator receptacles and provided with armature shafts, spring actuated lock and lever mechanism movably connected to the latter and to said indicator receptacles for returning and interlocking the parts in a stationary position when said solenoids are deënergized, and means for selectively releasing certain lock and lever mechanism and actuating the same and illuminating certain corresponding indicator receptacles when the connected solenoids are energized.

9. In a signaling device, a frame carrying a casing and provided with oscillatory indicators adapted to be projected beyond and retracted within said casing, solenoids and armatures movably interposed between and pivotally connected to and relatively movable of said indicators and frame, means for interlocking said solenoids and armatures and indicators within said frame, means for energizing and deënergizing said solenoids in selective relation to each other, means movably connected to said armatures for releasing said interlocking means when said solenoids are energized, and a source of illumination carried by each of said indicators in circuit with said means for energizing said solenoids.

10. In a signaling device, a frame provided with a casing having a recess in its bottom portion, lamp carrying indicators movably carried by said frame in said recess and adapted to be projected below said casing, relatively movable solenoids and armatures interposed between and flexibly connected to each of said indicators and to said frame, respectively, said solenoids being also relatively movable with respect to said indicator elements and frame, means for interlocking said solenoids and armatures in engagement with each other and with said indicators, means for selectively energizing and deënergizing said lamp carrying indicators and solenoids, and means for releasing said interlocking means for simultaneously illuminating and moving said lamp carrying indicators when said solenoids are energized.

11. In a signaling device, a frame carrying a casing provided with tilting indicators in its bottom adapted to be projected beyond and retracted within said casing, relatively movable solenoids and armatures flexibly connected to said indicators and frame, respectively, said solenoids being also relatively movable with respect to said indicator elements and frame, master and auxiliary levers for interlocking said armatures in engagement with said frame, links flexibly connecting said auxiliary levers to said indicators, means for energizing and deënergizing said solenoids in selective relation to each other, means for releasing said interlocking levers when said solenoids are initially energized, and means for returning said parts to interlocking position when said solenoids are deënergized.

12. In a signaling device, a frame provided with a casing, indicators movably carried by said frame and adapted to be projected beyond said casing, relatively movable solenoids and armatures provided with lever latching and link mechanism interposed between and flexibly connected to each of said indicators and to said frame, said solenoids being also relatively movable with respect to said indicator elements and frame, means for interlocking said solenoids and armatures through said lever latching and link mechanism, means for selectively energizing and deënergizing said indicators and solenoids, and means for initially releasing said interlocking means and for simultaneously illuminating and moving said indicators when said solenoids are energized.

In testimony whereof we have affixed our signatures in the presence of two witnesses.

FRED F. WEISHAAR.
BENJAMIN R. DRAUDT.

Witnesses:
R. W. JEREMIAH,
CARL URY.